United States Patent [19]
Legler

[11] 3,889,051
[45] June 10, 1975

[54] METHOD AND SYSTEM FOR TRANSMITTING SIGNALS FROM A SELECTED ONE OF A PLURALITY OF VIDEO SOURCES IN A CENTRAL APPARATUS ROOM AND THE ASSOCIATED AUDIO AND CONTROL SIGNALS TO AT LEAST ONE TELEVISION STUDIO

[75] Inventor: Ernst Legler, Seeheim, Germany

[73] Assignee: Robert Bosch Fernsehanlagen G.m.b.H., Darmstadt, Germany

[22] Filed: May 16, 1974

[21] Appl. No.: 470,468

[30] Foreign Application Priority Data

May 18, 1973 Germany............................ 2325192

[52] U.S. Cl...... 178/5.6; 178/DIG. 13; 178/DIG. 23
[51] Int. Cl............................ H04n 7/10; H04n 7/18
[58] Field of Search........... 178/5.6, 5.8 R, DIG. 13, 178/DIG. 23, DIG. 30

[56] References Cited

UNITED STATES PATENTS 3,757,225 9/1973 Ulicki ................................ 325/308

*Primary Examiner*—Robert L. Richardson
*Attorney, Agent, or Firm*—Michael S. Striker

[57] ABSTRACT

At least one television studio is to receive video signals from a selected video source and the associated audio and remote control signals, where the video and associated signals are each furnished by one of a plurality of signal sources located in a central apparatus room. The DC remote control signals are converted into audio frequency signals and are multiplexed with the corresponding audio signals. In one embodiment of the invention, each video signal source is connected to one input of a switching matrix whose output is connected to the television studio, the switching matrix being externally operable to connect the selected input to the output. A second switching matrix has a plurality of inputs each receiving one of the multiplexer signals and also an output connected to the television studio, the second switching matrix being selectively operable to connect the multiplexer signal corresponding to the selected video signal to the output. In a second embodiment, the multiplexed audio signal is first modulated onto a carrier signal having a frequency outside of the video signal frequency band. A modulated signal is then combined with the video signal and the so-combined signal is applied to one of a plurality of inputs of a single switching matrix whose output is connected to the television studio.

12 Claims, 3 Drawing Figures

METHOD AND SYSTEM FOR TRANSMITTING SIGNALS FROM A SELECTED ONE OF A PLURALITY OF VIDEO SOURCES IN A CENTRAL APPARATUS ROOM AND THE ASSOCIATED AUDIO AND CONTROL SIGNALS TO AT LEAST ONE TELEVISION STUDIO

BACKGROUND OF THE INVENTION

The present invention relates to a television complex wherein a television complex is defined to contain at least one television studio and a central apparatus room housing a plurality of signal sources including a plurality of video signal sources, for furnishing video signals, a plurality of audio signal sources, each associated with a corresponding one of said video signal sources for furnishing program audio signals and a plurality of control signal sources each associated with a corresponding one of said video signal sources for furnishing DC remote control signals. The video, program audio, and remote control signals associated with a particular television program are to be transmitted simultaneously from the central apparatus room to the television studio. Further, the television complex may contain more than one television studio.

In such a television complex with a plurality of television studios, each of the studios will have its own television camera for generating video signals. Additional video signals may however be required such as signals from film or slide scanners, signals from magnetic tape recordings and such, where the latter apparatus is generally located in a central apparatus room serving all of the studios and furnishes signals as required to each of these studios. All signals associated with a particular program, that is the video signals, one or two associated program audio signals, a DC remote control signal and voice signals allowing communication between the apparatus room and each studio are to be transmitted simultaneously. Also, signals generated at the studio which are, for example, to be recorded on tape in the apparatus room together with the relevant control signals such as signals for starting, stopping, rewinding, recording, playback, etc. are to be transmitted simultaneously to the apparatus room.

In known systems of this type, a plurality of switching matrixes each having externally operable switching connectors are utilized, one of these matrixes may for example switch only video signals, another program audio signals, still a third remote control signals while a fourth may handle voice control signals. This switching arrangement just for remote control and voice communication associated with some video signal sources in the apparatus room may require as many as forty switching matrixes.

SUMMARY OF THE INVENTION

It is an object of the present invention to effect the signal transmission between the above-mentioned central apparatus room and one or more television studios in such a manner that, while all required signals are transmitted simultaneously, only one or two switching matrixes are required.

The present invention resides in a television complex including at least one television studio and a central apparatus room housing a plurality of signal sources, including a plurality of video signal sources for furnishing video signals, a plurality of audio signal sources each associated with a corresponding one of said video signal sources, for furnishing program audio signals, and a plurality of control signal sources, each associated with a corresponding one of said video signal sources, for furnishing DC remote control signals. It is a system for controlling the transmission of signals from said central apparatus room to said television studios and comprises coding means connected to said remote control means for converting said DC remote control signals into corresponding audio frequency remote control signals. It further comprises a plurality of multiplexer means each having inputs connected to receive said audio frequency remote control signals and said program audio signals associated with a determined one of said video signals, each for multiplexing said audio signals at its inputs and furnishing a corresponding multiplexed audio signal. It further comprises selectively operable switching means having an output connected to said television studio and a plurality of input means, each for receiving one of said video signals and the associated one of said multiplexer output signals for connecting a selected one of said input means to said output under external control, whereby video signals and associated program audio and remote control signals are transmitted simultaneously from said central apparatus room to said television studio.

The invention is based on the fact that a plurality of control signals may be transmitted in coded form serially over only a single line. If for example a command is subdivided into two "words", namely a control function and the control value associated therewith, then for eight bits per word, 256 different control functions each having 256 associated control values may be transmitted with 16 bits serially on a single line.

By choosing a correct frequency in the coding process, it is possible to match the bandwidth required for the remote control signals to that of an audio channel. Thus it could be accomplished that the switching means would require only one matrix for the video signals and a plurality of matrixes for the "audio signals".

Further, the number of matrixes can be reduced by multiplexing the different program audio signals with the corresponding coded remote control signal so that a single multiplexed audio signal is associated with each video signal. Thus only one switching matrix is required for the video signal and one for the associated audio signals.

In a preferred embodiment of the present invention, the video and the multiplexed audio signals are thus furnished separately to the switching arrangement and to different matrixes thereof but are transmitted simultaneously.

In an alternate preferred embodiment, the multiplexed audio signal is modulated onto a carrier signal having a frequency lying outside of the video signal frequency band. The resultant modulated signal is mixed with the video signal and the so-formed combined signal is transmitted through a single switching matrix to the television studio. At the television studio filters are provided which separate the video signal from the audio multiplexed signal.

In order to prevent any deterioration of the video signal by the combined transmission with the modulated signal, the carrier frequency of the modulated signal is selected to be two to three times the frequency of the highest maximum frequency in the video signal band.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
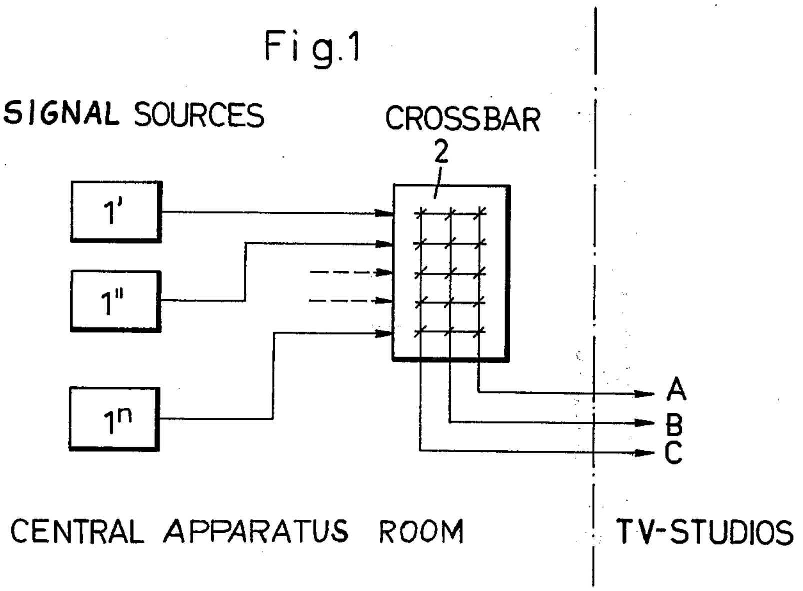
FIG. 1 is a basic diagram showing the television complex throughout which signal transmission is to be controlled.

A preferred embodiment of the present invention will now be described with reference to the drawing. First, it should be noted that in the various Figures, the same elements are designated by the same reference numerals.

FIG. 1 illustrates the underlying problem of the present invention. It shows a central apparatus room housing a plurality of signal sources 1', 1'' and 1$^n$. All of these signal sources feed into switching means which are selectively switched to connect the various sources to one of three studios, namely a studio A, a studio B or a studio C. The signal sources 1', 1'' and 1$^n$ may comprise slide or film scanners, tape recorders, etc. The switch means 2 are matrix-type or cross-bar-type arrangements wherein a selected input may be connected to a selected output. Thus any one of the signal sources 1'–1$^n$ may be connected to any one of the studios, that is any one of studios A–C.

Figure 2:
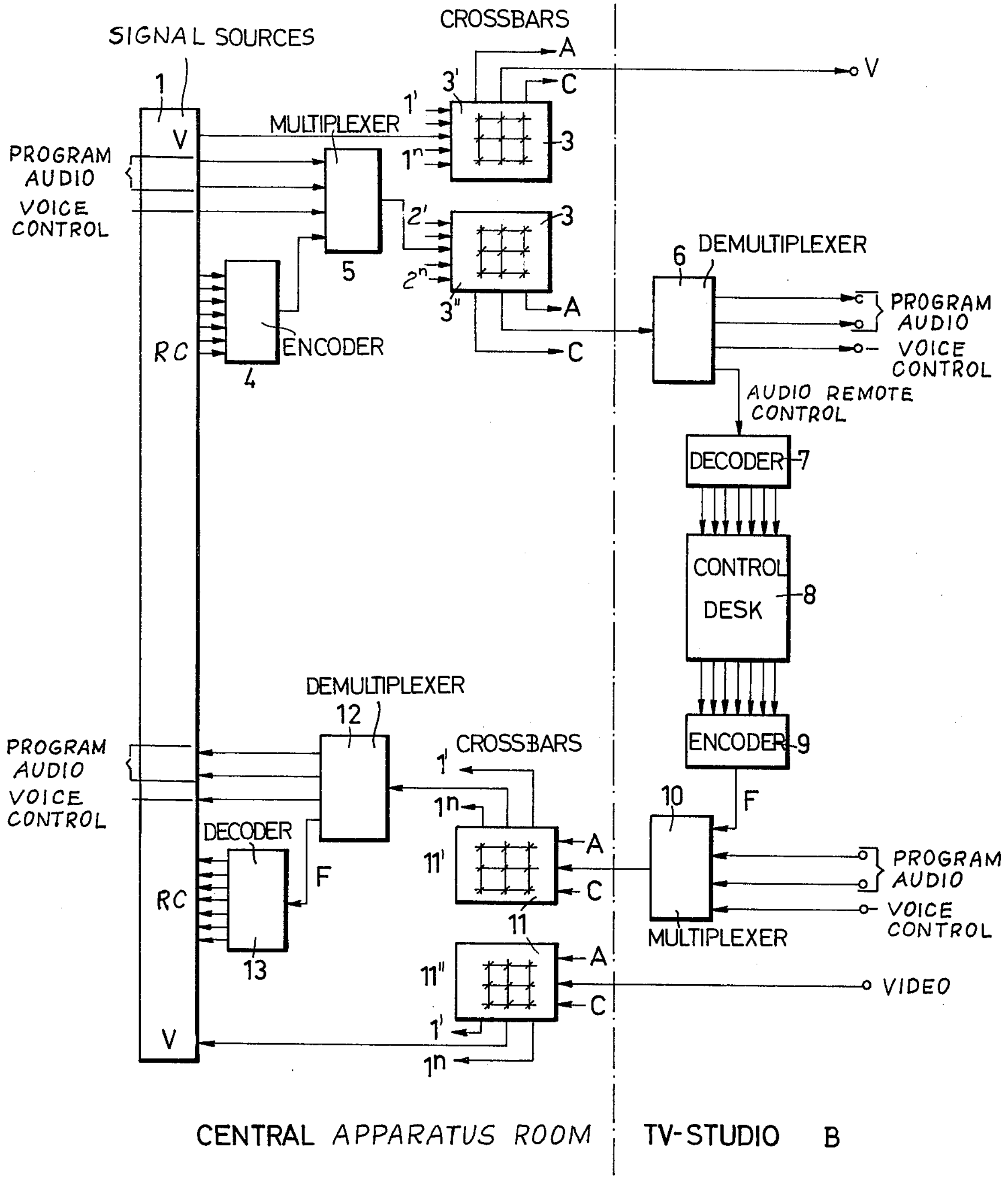
FIG. 2 is a block diagram of an embodiment of the present invention utilizing two switching matrixes.

FIG. 2 is a block diagram showing one embodiment of the present invention. Equipment on the left of the dash-dot line is equipment in the central apparatus room, while equipment to the right of that line is in a selected television studio, that is television studio B. A video signal source is labelled V, while pictured underneath are two associated program audio sources which are so labelled. A voice control signal source is pictured underneath the program audio sources, while a plurality of DC remote control signals are generated by a source labelled RC. As shown in FIG. 2, the video signal V is applied to a selected one of a plurality of inputs labelled 1'–1$^n$. Each of the other inputs of course also has a video signal applied thereto but these are omitted from the Figure for purposes of clarity. All inputs are applied to a switching matrix 3' which forms part of the selective switching means 3. The outputs of switching matrix 3' are connected to studios A, B and C, the particular output to studio B being of interest here. Also having outputs connected to studios A, B and C is a second switching matrix 3'' of the selected switching means 3. This has a plurality of inputs labelled 1'...1$^n$ which correspond in number to the inputs of switching matrix 3'. A selected one of these inputs is connected to the output of a multiplexer 5. The inputs of multiplexer 5 are, first of all, the program audio signals furnished by the two above-mentioned program audio signal sources. Further, a third input of multiplexer 5 is connected to receive the voice control signal. It should be noted that these are required to effect voice communication between the central apparatus room and the television studio, that is, for example, between a technician in the former and the director directing the show in the latter. The fourth input of multiplexer 5 is connected to the output of a coder at whose input are connected the various remote control signals which are DC signals. These signals may be signals which indicate whether a particular signal source is operative or inoperative, that is purely binary signals or else they may be DC signals of varying amplitude which indicate the amplification, gradation, etc. of the particular video signal source associated with the remote control signals. As seen in the drawing, these signals are presented in parallel to the coding means. The coding means comprise first an analog-digital converter which converts the analog voltage levels into digital signals. The digital signals appear at the output of the analog digital converter in parallel form. These signals are then converted from the parallel to the serial form, the frequency of sampling of the parallel signals being adjusted to the band width of an audio channel, for example that of the program audio channels. For this parallel-series conversion which is actually a multiplexing operation, the circuit shown in FIG. 9.1, page 329, of the book "Operational Amplifiers" by Tobey, Graeme and Huelsman, Burr-Brown Research Corporation, McGraw-Hill Book Company, 1971. The same multiplexer may also be utilized as the above-described multiplexer 5. Both switching matrixes 3' and 3'' are externally operable, that is the connections indicated by cross-bars in this Figure are selectively switchable by the technician to connect a particular signal source to the selected television signal. Thus switching matrix 3' and switching matrix 3'' are simultaneously adjusted to connect corresponding signals to the same television studio. As seen in FIG. 2, the video signal is received at television studio B and the associated audio multiplex signal is applied to a demultiplexer 6. At the output of demultiplexer 6 appear the two program audio signals, the voice control signal and the coded remote control signals, that is the remote control signals which have been converted to audio frequency remote control signals. Also, these signals are still in serial form, that is they are received bit serially. The last-mentioned signals are applied to the input of a decoder 7 which first converts the so-received serial signals into parallel form and then into a digital-analog converter which converts them back into DC signals. The received DC control signals are then applied to control panel 8 for the director's information.

Further shown in FIG. 2 is equipment for transmitting signals from television studio B to the central apparatus room. The same principle is applied as was applied to the transmission from the central apparatus room to the studio. The signals to be transmitted from the studio to the central apparatus room include, for example, a television program and the associated control signals which is to be recorded in the central apparatus room. Thus remote control signals for activating the correct equipment are furnished at the control panel 8 and transmitted through a coder 9 (which works identically with coder 4) to one input of a multiplexer 10. The other inputs of multiplexer 10 are connected to receive associated program audio signals and voice control signals. At the output of multiplexer 10 is thus a multiplexed audio signal which comprises all control and program audio signals associated with a particular video signal. The video signal is transmitted to the input B of a matrix 11'' which forms part of a selectively operable switching means 11. The switching matrix 11'' has inputs from each studio and outputs connected to various video signal receiving equipment such as video tape recorders, etc. The multiplexed audio signal from multiplexer 10 is applied to one input of a second switching matrix marked 11' which is also part of the selective switching means 11. Each of the outputs of matrix 11' is connected to a demultiplexer 12, each of the demultiplexers 12 being associated with a particular recording equipment. Again at the output of the demultiplexer are the program audio signals and the voice control signals as well as the encoded remote control signals denoted by F in FIG. 2. The remote control signals then are applied to the input of a decoder 13 which operates identically with decoder 7 and furnishes the various required DC remote control signals in parallel form. In the event that the switching matrix 11'' is not required for transmitting video signals it can be used for transmitting synchronizing signals or, alternatively, if not required at all can be omitted. It is thus seen that transmission from the central apparatus room to the television studio and back can be accomplished using, in each direction, only two switching matrixes when the embodiment of FIG. 2 is used.

Figure 3:
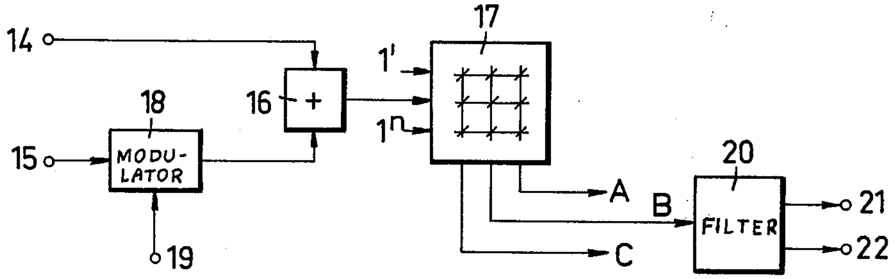
FIG. 3 is a block diagram of a second preferred embodiment of the present invention utilizing a single switching matrix.

In FIG. 3 an alternate embodiment is shown. In this embodiment the multiplexed audio signal, that is the signal at the output of multiplexer 5, is applied to a terminal 15 which is one input to a modulator 18. Modulator 18 is used to modulate the multiplexed audio signal onto a carrier signal which is applied at a terminal 19. The frequency of the carrier signal must be chosen to be outside of the video frequency band and further, to prevent degradation of the video signal, should be about two or three times the frequency of the highest frequency of the video signal band. The output of modulator 18 is applied to a summing circuit 16 to whose other input is applied to the video signal. At the output of summing circuit 16 is furnished the combined signal which is applied to one input of a single switching matrix 17. The remaining inputs of this switching matrix are connected to the outputs of similar summing circuits associated with the remaining ones of the video signals. The connections in matrix 17 are then so adjusted that the selected input signal is forwarded to the corresponding studio, in this case studio B. At the studio a filter 20 separates the video signal from the modulated signal which carries the multiplexed audio signal as modulation. The first of these signals is furnished at a terminal 21 while the second is furnished at a terminal 22. The multiplexing and then decoding takes place as in FIG. 2 and will not again be described here. It should only be noted that in this embodiment a single switching matrix can be used for simultaneous transmission of all signals associated with a particular program, both video, audio and control.

It will be noted that the system of the present invention allows the simultaneous transmission of all these signals with a great induction of switching apparatus.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is:

1. In a television complex including at least one television studio and a central apparatus room housing a plurality of signal sources, including a plurality of video signal sources for furnishing video signals, a plurality of audio signal sources, each associated with a corresponding one of said video signal sources, for furnishing program audio signals, and a plurality of remote control signal sources, each associated with a corresponding one of said video signal sources, for furnishing DC remote control signals, a system for controlling the transmission of signals from said central apparatus room to said television studio, comprising, in combination, coding means connected to said remote control means for converting said DC remote control signals into corresponding audio frequency remote control signals; a plurality of multiplexer means each having inputs connected to receive said audio frequency remote control signals and said program audio signals associated with a determined one of said video signals each for multiplexing said audio signals at its inputs and furnishing a corresponding multiplexed audio signal; and selectively operable switching means having an output connected to said television studio and a plurality of input means, each for receiving one of said video signals and the associated one of said multiplexer output signals, for connecting a selected one of said input means to said output under external control, whereby video signals and associated program audio and remote control signals are transmitted simultaneously from said central apparatus room to said television studio.

2. A system as set forth in claim 1, further comprising demultiplexer means at said television studio for receiving said multiplexed audio signal and converting it into corresponding received program audio and received remote control signals; and decoding means connected to said demultiplexer means for receiving said received remote control signals and furnishing corresponding decoded remote control signals, whereby a selected video signal and the associated program audio and remote control signals are furnished at said television studio substantially simultaneously.

3. A system as set forth in claim 2, wherein said selectively operable switching means comprise a first switching matrix having a plurality of inputs each connected to a corresponding one of said video signal sources and a first matrix output connected to said television studio, for connecting said first matrix output to a selected one of said video signal sources under said external control, and a second switching matrix having a plurality of inputs each connected to a corresponding one of said multiplexer means and an output connected to said television studio, for connecting said output to the multiplexer means associated with said selected video signal source under said external control.

4. A system as set forth in claim 2, wherein said video signals have a frequency range limited to a predetermined frequency band; wherein said input means each comprise means for furnishing a carrier signal having a frequency exceeding the highest frequency in said predetermined frequency band; modulator means, each connected to said carrier signal furnishing means and a corresponding one of said multiplexer means, for modulating said multiplexer output signal onto said carrier signal and furnishing a corresponding modulated carrier signal; summing circuit means each connected to one of said video signal sources and the corresponding one of said modulator means for superimposing said modulated signal upon said video signal and furnishing a corresponding combined signal; and wherein said selectively operable switching means further comprise a single switching matrix having a plurality of input terminals, each for receiving one of said combined signals and an output terminal connected to said television studio.

5. A system as set forth in claim 4, further comprising filter circuit means at said television studio, said filter circuit means having an input for receiving said combined signal and a first and second output for furnishing, respectively, said multiplexer output signal and said video signal.

6. A system as set forth in claim 1, wherein said DC remote control signals to be transmitted to said television studio comprise signals indicative of the execution or lack thereof of a command received from said television studio by apparatus in said central apparatus room.

7. A system as set forth in claim 6, further comprising means at said television studio for furnishing DC remote control signals for operating said apparatus at said central apparatus room; coding means at said studio for coding said DC remote control signals and furnishing corresponding studio audio frequency control signals; at least one television pickup means at said television studio for furnishing studio video signals and associated stuido program audio signals; multiplexer means for multiplexing said studio program audio signals and said studio audio frequency control signals and furnishing a corresponding studio multiplexer output signal; and selectively operable switching means at said studio, having an output connected to said central apparatus room and a plurality of input means each connected to receive a video signal and a corresponding one of said multiplexer output signals, connecting a selected one of said input means to said output under external control, thereby furnishing a selected video signal and the associated one of said multiplexer output signals at said central apparatus room.

8. In a television complex having at least one television studio and one central apparatus room having a plurality of video signal sources for furnishing video signals, program audio signal sources for furnishing program audio signals associated with corresponding ones of said video signals and remote control signal sources for furnishing DC remote control signals associated with corresponding ones of said video signals, a method for transmitting a selected one of said video signals and the program and remote control signals associated therewith from said central apparatus room to said television studio comprising, in combination, the steps of converting each of said DC remote control signals to a corresponding audio frequency remote control signal; multiplexing each of said audio frequency remote control signals with the corresponding one of said program audio signals and furnishing corresponding multiplexer output signals; and switching said selected video signal and the corresponding one of said multiplexer output signals to a determined output for transmission to said television studio.

9. A method as set forth in claim 8, wherein said step of multiplexing comprises the step of frequency multiplexing said program audio signals with the corresponding one of said audio frequency control signals.

10. A method as set forth in claim 9, wherein said step of multiplexing is a step of time multiplexing with pulse amplitude modulation.

11. A system as set forth in claim 8, wherein said step of multiplexing comprises time multiplexing with pulse width modulation.

12. A method as set forth in claim 8, wherein said step of multiplexing comprises time multiplexing with pulse phase modulation.

* * * * *